United States Patent

[11] 3,628,602

[72] Inventor Fred William Brunner
Eugene, Oreg.
[21] Appl. No. 54,145
[22] Filed July 13, 1970
[45] Patented Dec. 21, 1971
[73] Assignee Manning's, Inc.
San Francisco, Calif.

[54] PROCESSING APPARATUS
7 Claims, 11 Drawing Figs.

[52] U.S. Cl. .................................... 165/61,
165/94, 165/109, 165/120
[51] Int. Cl. ........................................ F25b 29/00
[50] Field of Search ............................ 165/61, 94,
109, 120

[56] References Cited
UNITED STATES PATENTS
783,624 2/1905 Davis ............................ 165/120
2,917,284 12/1959 Christian ...................... 165/87
3,255,814 6/1966 Zimmermann et al. ........ 165/120

Primary Examiner—Charles Sukalo
Attorney—Christen & Sabol

ABSTRACT: An apparatus is described for heating or cooling food mixes with simultaneous mixing or blending. The apparatus comprises a vessel having a pair of sidewalls, a pair of end walls and a bottom, said bottom including an upwardly extending divider means positioned longitudinally centrally between said sidewalls, said divider means having end walls spaced from the end walls of the vessel and sidewalls spaced from the sidewalls of the vessel, each said divider sidewall and the adjacent vessel sidewall merging into an arcuate bottom portion to form a pair of side-by-side trough portions within said vessel with connecting passages at the ends thereof, heat exchange means for heating or cooling the surfaces of the side-by-side trough portions in contact with the material and a pair of material conveying augers disposed within said trough portions with the peripheries of the augers in close proximity with the trough portions, means for rotating said augers whereby material acted upon by the flight means of one auger is moved in a direction opposite to that which the other auger moves material whereby the material is caused to move in a circuitous path along the troughs and through the connecting end passageways.

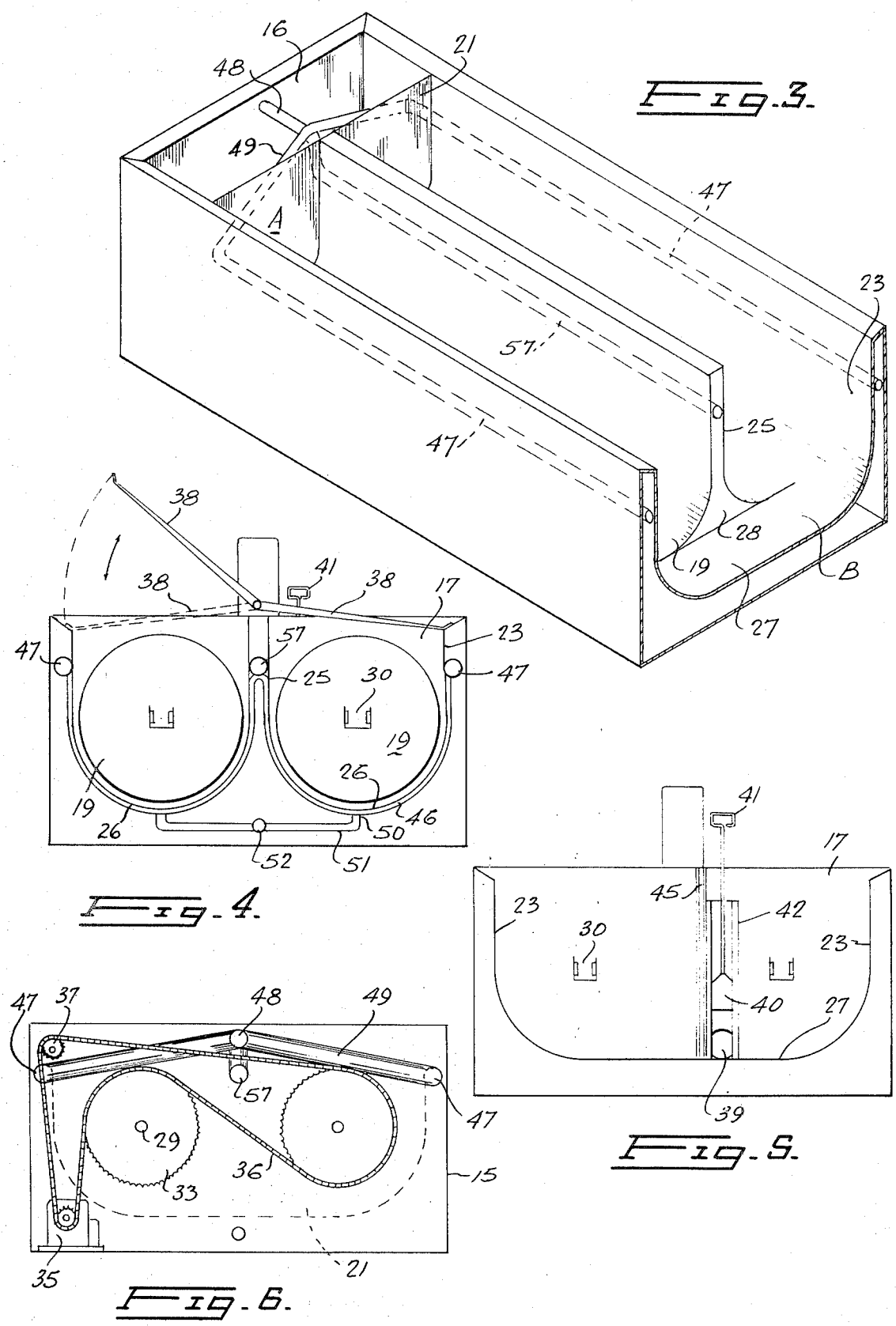

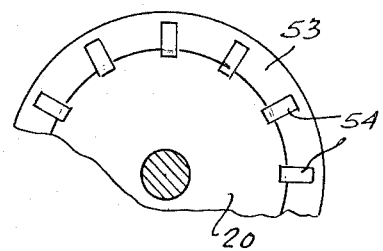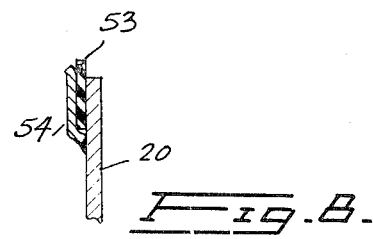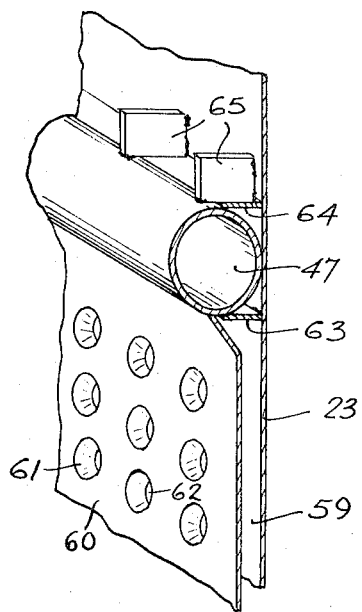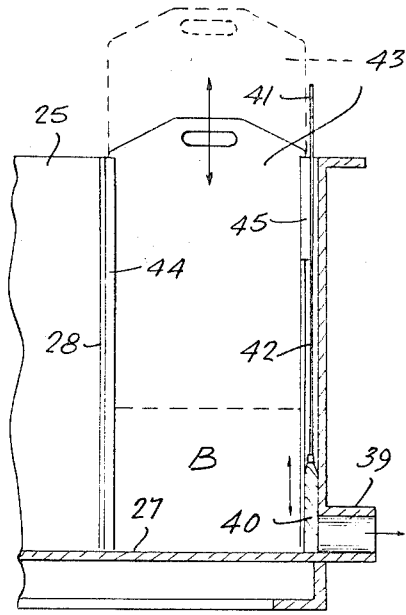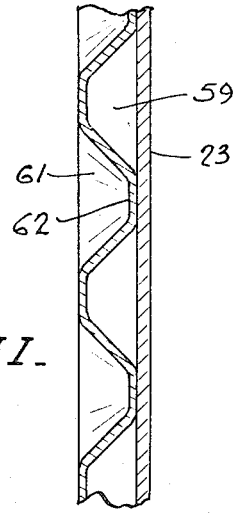

PROCESSING APPARATUS

BACKGROUND OF THE INVENTION

1. Field of the Invention

This invention relates to a processing apparatus and particularly to an apparatus for heating and/or cooling moist food mixes.

2. Description of the Prior Art

In the food and chemical industries there are many instances where it is desired to subject materials undergoing processing to heating or cooling operations while at the same time mixing or blending them. Particular reference can be made to operations where the material forms a mix of semifluid or pastelike consistency, as for example moist food mixes. Various devices have been available for many years for handling such materials on a commercial scale but these have all had many deficiencies. Thus, they have not tended to provide efficient mixing of the materials, there has been a tendency for the materials themselves to cake on the heat exchange surface and the processing vessels have been difficult to clean.

It is, therefore, the objection of the present invention to provide an improved processing vessel in which food mixes and the like can be subjected to heating and/or cooling while at the same time being blended or mixed.

SUMMARY OF THE INVENTION

The processing apparatus of this invention includes a vessel having a pair of sidewalls, a pair of end walls and a bottom. The bottom includes an upwardly extending divider means positioned longitudinally centrally between the sidewalls and includes end walls spaced from the end walls of the vessel as well as sidewalls spaced from the sidewalls of the vessel. Each divider sidewall and the adjacent vessel sidewalls merge into an arcuate bottom portion thus forming a pair of side-by-side trough portions within the vessel with connecting passageways at the ends. Heat exchange means are provided for heating or cooling the surfaces of these side-by-side trough portions in contact with the material being processed. A pair of material conveying augers are disposed within the trough portions with the peripheries of the augers in close proximity with the trough portions. Means are provided for rotating these augers whereby material acted upon by the flight means of one auger is moved in a direction opposite to that which the other auger moves material whereby the material is caused to move in a circuitous path along the troughs and through connecting end passageways.

DESCRIPTION OF PREFERRED EMBODIMENTS

This apparatus is particularly useful as a cooker and for this purpose the trough portions are formed with double walls to form steam jackets for heating the materials. The flights of the augers are also preferably provided with soft resilient peripheral edges which scrape against the trough portions to keep the heat exchange surfaces free of congealing material being processed. The vessel surfaces in the end passageways are preferably not heated and this avoids any tendency for the material being processed to stick to the surfaces in those areas.

It will be seen that with this arrangement the material being processed is maintained in a continuous flow in a circuitous path within the vessel and is being continuously mixed or blended while passing over the heat exchange surfaces. This unique design permits within a batch vessel all of the advantages of a continuous swept surface heat exchange operation while at the same time retaining all of the inherent advantages of a batch operation.

With the apparatus of this invention the batch of material to be processed is normally added through the top of the processing vessel but the inherent characteristics of the device can be used to advantage for emptying the vessel when the processing is completed. Thus, a discharge outlet can be provided in one end wall of the vessel adjacent the end of an auger delivering material to that end and a closure device can be provided for closing the connecting end passageway adjacent the discharge outlet. With the connecting passageway closed and the discharge outlet opened, it will be seen that the augers will act together to pump all of the processed material out of the vessel through the one discharge opening.

Additional features of the invention will appear from the following description in which a preferred embodiment has been set forth in detail in conjunction with the accompanying drawings in which:

FIG. 3 is a perspective view of the apparatus with portions broken away;

FIG. 4 is a sectional view taken along line IV—IV of FIG. 1;

FIG. 5 is a sectional view taken along the line VI—VI of FIG. 1;

FIG. 6 is an end view of the apparatus shown in FIG. 1;

FIG. 7 is an enlarged fragmentary view showing a portion of an auger flight;

FIG. 8 is an enlarged fragmentary sectional view of an auger flight;

FIG. 9 is a detail in partial section along the line IX—IX in FIG. 1;

FIG. 10 is a perspective view showing details of a heat exchange jacket; and

FIG. 11 is a section of a portion of the wall shown in FIG. 10.

Figure 1:
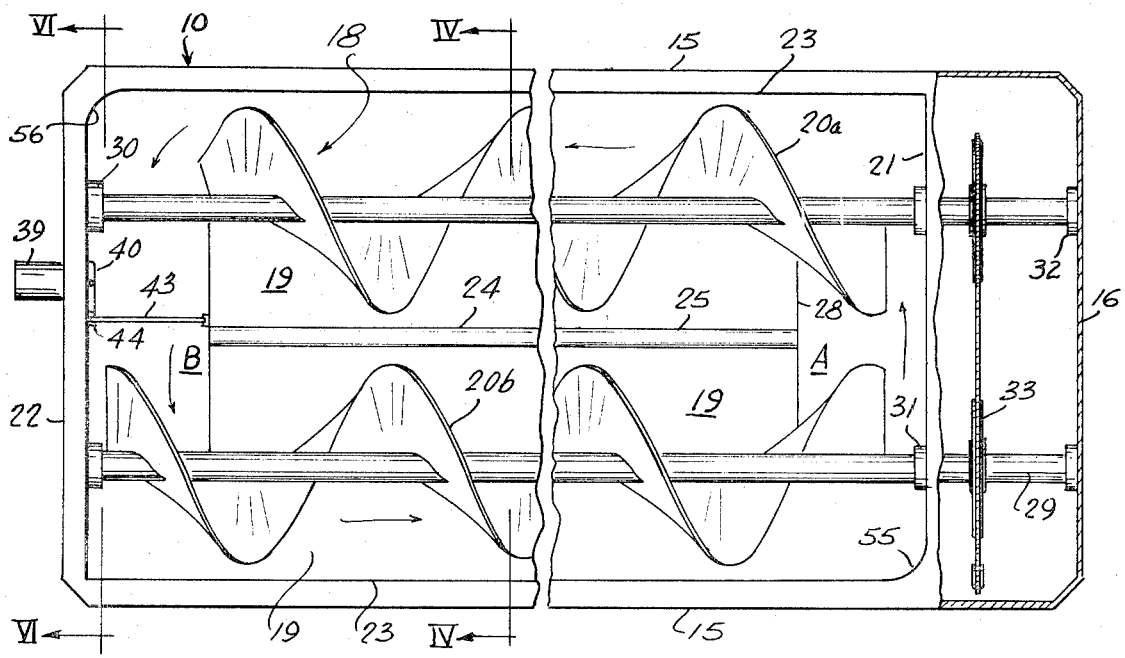
FIG. 1 is a plan view illustrating an apparatus incorporating the present invention.

The food processing apparatus shown in the drawings consists of a main rectangular housing 10, fabricated of suitable sheet metal, e.g. stainless steel. The housing includes vertical outer sidewalls 15, vertical end walls 16 and 17 and a bottom resting on a support frame 11. This support frame can conveniently rest on wheels 12 and support legs 13 and includes a hitch member 14 for transporting the apparatus to desired locations within the plant.

Within housing 10 is positioned a processing vessel 18 having a pair of side-by-side troughlike sections 19 within which are positioned augers 20a and 20b. The processing vessel 18 has vertical end walls, one of these being housing end wall 17 and the other being wall 21 spaced inwardly from housing end wall 16. The sidewalls 23 are also spaced inwardly from housing sidewalls 15. A partial dividing wall 24 extends longitudinally in the central area of processing vessel 18 with open areas A and B between the ends of the dividing wall 24 and the end walls 17 and 21 of the processing vessel. This divider 24 has a pair of sheet metal sidewalls 25 and, as can best be seen from FIGS. 3 and 4, the walls 25 and 23 are joined by a semicylindrical bottom wall 26 to form the pair of troughs 19 along those portions of the processing vessel 18 adjacent divider 24. The floor portions 27 in the open areas A and B are relatively flat as can be seen from FIG. 3 and the ends of the divider 24 are closed by means of sheet metal panels 28. Thus it will be seen that the processing zone 18 consists of a pair of trough portions 19 joined at the end by open areas A and B.

Figure 2:
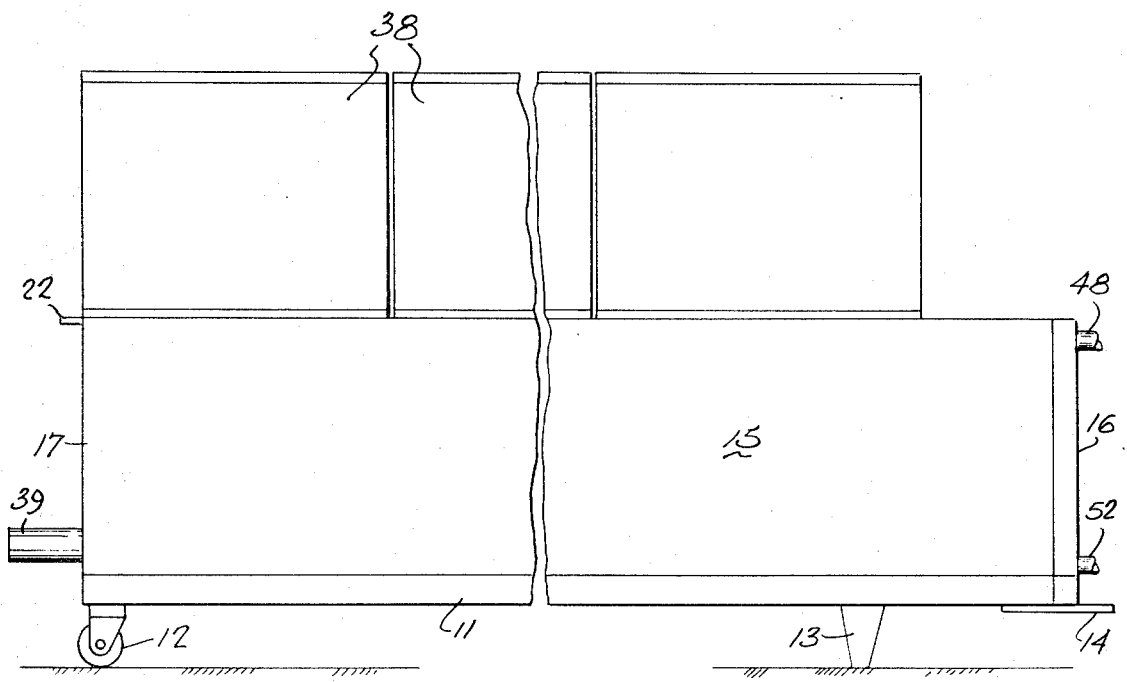
FIG. 2 is a side elevational view of the apparatus shown in FIG. 1.

The augers 20 are provided with continuous or substantially continuous flight means for moving the material being processed and these augers are arranged to fit snugly within the semicylindrical portions of the troughs 19. The augers are mounted on shafts 29 and these are supported by a bearing mounted in bracket 30 on end wall 17 and extend through end wall 21. Conveniently, these bearings are constructed of Teflon. The shafts 29 are mounted in end wall 21 by means of sealing bushings 31 and are also mounted in bushings 32 on outer end wall 16. Cog wheels 33 are keyed to shaft 29 and these are driven by electric motor 35 via chain drive 36 and idler pulley 37. The material to be processed is fed into the processing vessel 18 through the open top of the apparatus. This open top can be closed during processing by means of the lids 38 (shown in open position in FIG. 2). The processed material is removed from the vessel by way of discharge opening 39 mounted in end wall 17 adjacent the end of auger 20a. This outlet 39 is opened and closed by way of a slide plate 40 with handle 41 which travels in a pair of guides 42 mounted on the inside face of end wall 17.

Another slide plate 43 (FIG. 9) is also provided for closing the open end passage B in processing vessel 18. This slide travels on guide strip 44 mounted on end wall 28 of divider 24 and guide strip 45 on end wall 17. It will be seen from FIG. 9 that these guide strips are angled slightly with the vertical and this is to permit the slide 43 to pass the open lids 38.

The walls 25 of divider 24 as well as the adjacent sections of the walls 23 and floor areas 26 also serve as heat exchange surfaces for heating or cooling the material in the processing vessel 18. To serve this function they form one wall of heating or cooling jackets 46 as shown in FIG. 4. For cooking, these jackets are normally used as steam jackets and are supplied with steam via steam header pipes 47 and 57, steam inlet pipe 48 and steam connector pipes 49. The bottoms of the steam jackets 46 have therealong a series of outlets 50 which are connected to branch pipes 51 which in turn connect to drain pipe 52. These serve to collect the water condensed from the steam in the steam jacket 46. If a cooling fluid, e.g. glycol, is being passed through the same procedure is followed but with the glycol connected from drain pipe 52 being recycled through a refrigeration unit.

In order to achieve efficient heat transfer it is desirable that the thickness of the metal forming the heat exchange surface be kept to a minimum. At the same time, the heat exchange surfaces must be very rigid so that their shape will not change when steam pressure is applied to the jackets. To meet these requirements a series of reinforcing members are provided between the heat exchange wall and the outer wall of the jacket and details of a preferred form of these reinforcements are shown in FIGS. 10 and 11.

FIG. 10 shows a typical connection between sidewall header pipe 47 and heating or colling jacket 59 formed between heat exchange wall 23 and outer jacket wall 60. This outer jacket wall 60 is provided with a series of depressions or dimples 61 which are pressed such that the bottoms 62 thereof contact the heat exchange wall 23. The bottoms 62 are welded to wall 23 so that the combination of the walls 23 and 60 with the rigid connection therebetween formed by the sidewalls of the dimples provide a very rigid honeycomb type of structure. The dimples are conveniently of about one-inch diameter with center-to-center spacing of about 2 inches.

Although the apparatus normally operates a quite a low steam pressure of less than about 10 p.s.i.g., it must be able to meet the industrial standards as a steam vessel. For this purpose, additional reinforcing is provided at the connection between header pipe 47 and jacket 59. As will be seen from FIG. 10, a longitudinal reinforcing strip 63 is welded between the bottom of the pipe 47 and wall 23 and a second longitudinal reinforcing strip 64 is welded between the top of pipe 47 and wall 23. To further increase the rigidity of the connection, a series of small gusset plates 65 are provided, these being welded to wall 23 and strip 64.

In view of the fact that the interior surfaces of the troughs 19 may be heated or cooled, it will be evident that there is a difficulty of material tending to stick to the surfaces. In order to overcome this difficulty, the flights of the augers 20 are preferably provided with soft resilient edge strips 53 of rubber or rubbery plastic material, advantageously a temperature resistant material such as Neoprene. These edge strips 53, typically about 2 inches wide, are held firmly in position on the auger flights by means of cleats 54 welded to the flights and extend along the full length of the flight. The cleats at the end of the auger plates as well as one or more of the cleats along the flight are adjustable and serve as clamping members for firmly clamping the resilient strips 53 in position on the auger flights. The resilient strips 53 press against the curving surfaces of the troughs 19 and thus keep these surfaces swept free of any materials which would tend to congeal thereon, and thereby reduce heat transfer efficiency, result in product loss and cause cleaning problems. Additionally, the resilient strips give a good seal between the auger flights and the curved surfaces so that the product is continuously swept forward along the surface; this promotes good mixing (by eliminating dead pockets) and heat exchange efficiency.

In place of the edge strip 53 extending continuously along the peripheral edge of the flight, it is possible to insert spring-loaded straight vanes longitudinally along the auger in radial slots cut in the auger flights. These vanes have resilient edges which extend radially beyond the periphery of the auger and scrape the heat exchange surfaces. However, for the best combination of mixing efficiency and cleaning of the heat exchange surfaces the edge strip as shown in FIGS. 7 and 8 is preferred.

It has also been found that the corners of the processing vessel adjacent the ends of the augers delivering material to those ends tend to be dead corners in that the material being processed tends to remain in those corners. This difficulty is overcome by providing rounded corners 55 and 56 in those locations as shown in FIG. 1.

A typical apparatus according to the invention has a processing zone having a length of about 8 feet and a width of about 4 feet and can hold about 2,500 pounds of material for processing. Such an apparatus is easily movable within a plant and is ideally used in conjunction with a service panel having connections for steam, water, coolant, say, glycol, electricity, etc. When being used, a series of apparatus according to the invention can be connected to the service panel and when a batch in one vessel is completed and emptied, the vessel can simply be moved to another section of the factory for cleaning and a clean vessel moved into location at the service panel.

A typical operation of the apparatus described above is as follows. With the two feed augers being rotated continuously, say, at between about 5 and 40 r.p.m., a bath of material to be processed is introduced into the processing vessel 18 whereby it is operated upon and transported forward by the flights. Steam for instance, under a pressure of between 1 and 15 p.s.i.g., depending on the temperature desired, is passed through the steam jackets to heat the material in the apparatus. In general, auger 20a moves the material toward the left and auger 20b moves the material to the right, while simultaneously gently working and mixing the material. At the right hand end of auger 20b, the material tends to expand into the passageway A and thus cross over into the other half of the processing zone where it is operated upon by the flights of auger 20a. Likewise the compressed material from the left-hand end of auger 20a continuously expands into the passageway B and crosses over into the opposite side of the vessel where it is again acted upon by auger 20b. The expansion of the material into the passageway at each end of the vessel induces turbulence within the material which promotes efficient mixing of the material as does the abrupt change in direction as the material crosses over from one passageway to another. Thus it will be seen that there is a generally circulatory movement of the material is indicated by the arrows in FIG. 1.

This continuous circulatory movement of the material means that it it kept in continuous movement over the heat exchange surfaces and by keeping these surfaces continuously swept clean by the rubber strips on the flights, a rapid and uniform heating of the material is achieved.

After the mixing operation has continued for a period of time sufficient for the desired processing action, the closure plate 40 is removed from the front of outlet 39 while flow closure plate 43 is inserted to close off the passageway B. With this passageway closed and the outlet open it will be seen that the circulatory movement of the material is stopped and all of the material contained in the brewing vessel is discharged through the outlet 39. This results in a continuous discharge of the batch of material, for instance, to a holding vessel, and because of the arrangement of augers, the discharge operation progressively removes all the material undergoing treatment, under sanitary conditions, without the need for an external pump. Also with this arrangement, agitation of the material continues during discharge so minimizing post-mixing separation.

The apparatus can be used for preparing a large variety of food products, such, for example, as sauces, gravies, stews, salads, enchiladas, preserves, dairy products and the like. As a typical example of how the apparatus can be used to heat advantage, there can be mentioned the preparation of chicken-a-la-king. The gravy components for chicken-a-la-king are added to the vessel and steam is applied to heat the liquid to cooking temperature. This can be done in a very short period of time with a steam pressure of about 5 p.s.i.g. When the gravy is at cooking temperature, this temperature can easily be maintained with a steam pressure of about 1—2 p.s.i.g. When the cooking is completed, the steam is shut off and a coolant, e.g. glycol, ammonia or brine, is passed through the heat exchange walls to quickly cool the gravy. The separately cooked chicken chunks are then added to the cooled gravy and these are mixed together by the blending action of the rotating augers operating at 8 r.p.m. In this way, the chicken pieces are uniformly distributed throughout the gravy very rapidly and, surprisingly, with little disintegration of the chicken pieces. The completed batch of chicken-a-la-king can then be automatically discharged from the vessel by the action of the augers, and the agitation during discharge prevents separation of the chicken pieces.

The apparatus of the invention can also be used advantageously with an automatic packaging device with the action of the augers during discharge of material serving to provide a very steady flow of material to, for instance, an impeller pump. In this way the product can be pumped into a holding vessel from which it can be automatically discharged into convenient packages for distribution.

Thus, it will be evident that the apparatus described above is well suited for use in processing a wide variety of materials, including pulps, slurries, pastelike materials and the like, containing solid materials together with water and other liquid media. The manner in which the material is discharged avoids all tilting of the vessel and facilitates the use of the apparatus as one part of a complete processing system in which the material can be cooked, cooled and discharged to a packing station in a single vessel, this combining the inherent advantages of a batch system with those of a continuous operation. The apparatus also lends itself to maintenance of sanitary conditions, such as are important in the processing of food materials.

We claim:

1. A processing apparatus comprising a vessel having a pair of sidewalls, a pair of end walls and a bottom, said bottom including an upwardly extending divider means positioned longitudinally centrally between said sidewalls, said divider means having end walls spaced from the end walls of the vessel and sidewalls spaced from the sidewalls of the vessel, each said divider sidewall and the adjacent vessel sidewall merging into an arcuate bottom portion to form a pair of side-by-side trough portions within said vessel with connecting passages at the ends thereof, heat exchange means for heating or cooling the surfaces of the side-by-side trough portions in contact with the material and a pair of material conveying augers disposed within said trough portions, one in each trough portion, with the peripheries of the augers in close proximity with the trough portions, means for rotating said augers in close proximity with the trough portions, means for rotating said augers whereby material acted upon by the flight means of one auger is moved in a direction opposite to that which the other auger moves material whereby the material is caused to move in a circuitous path along the troughs and through the connecting end passageways.

2. An apparatus according to claim 1 wherein a product discharge outlet is provided in an end wall of the vessel adjacent the end of an auger delivering material to that end.

3. An apparatus according to claim 2 wherein a closure device is provided for closing the connecting end passageway adjacent the discharge outlet.

4. An apparatus according to claim 1 wherein the heat exchange means is in the form of a double wall jacket through which a heating or cooling medium passes.

5. An apparatus according to claim 4 wherein the jacket includes an inner heat exchange wall and an outer wall having inwardly directed dimples with the bottoms of the dimples contacting and being welded to the heat exchange wall to form a rigid structure.

6. An apparatus according to claim 1 wherein a soft, resilient strip is attached to the periphery of an auger flight, said strip being adapted to scrape the heat exchange surfaces.

7. An apparatus according to claim 6 wherein the resilient strip is removably mounted on the auger by means of cleats.

* * * * *